June 29, 1926.
H. P. SPARKES
1,590,452
GRAPHIC METER POINTER
Filed Nov. 6, 1919
Fig. 1.
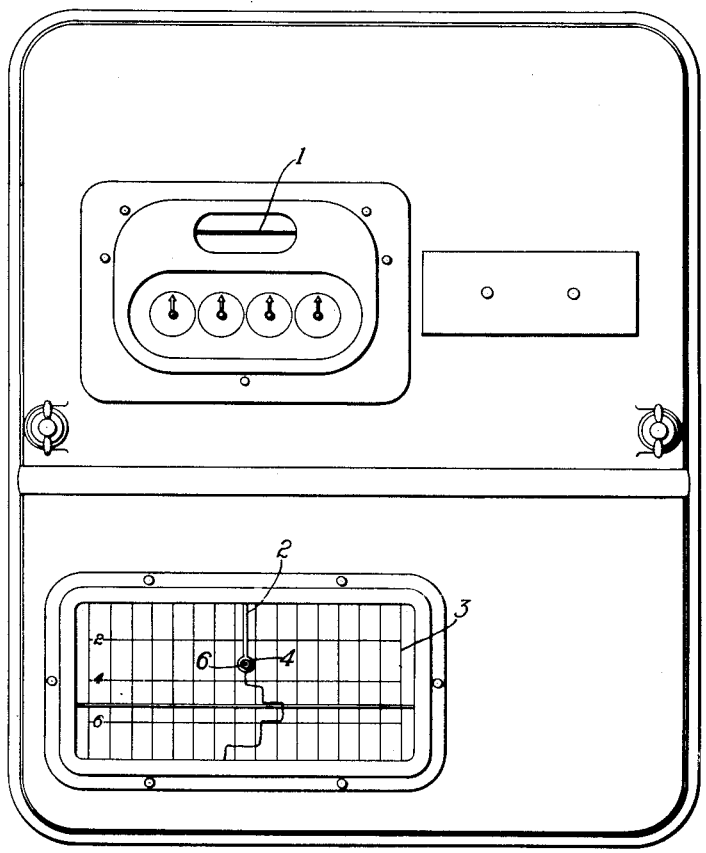
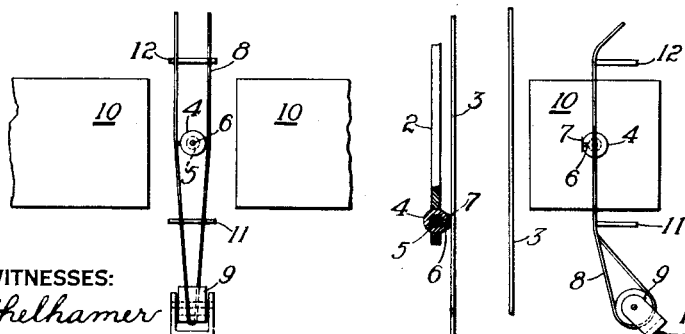
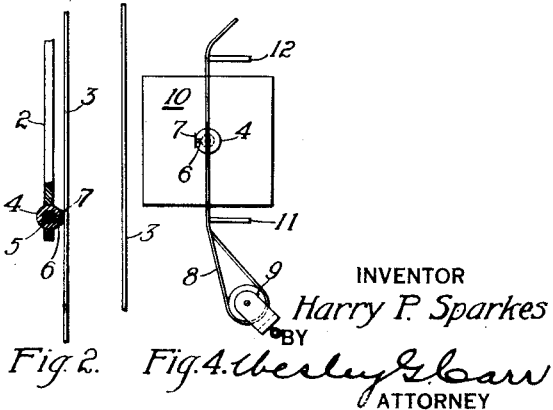
WITNESSES:
H. T. Shelhamer
J. E. Coster
Fig. 3.  Fig. 2.  Fig. 4.
INVENTOR
Harry P. Sparkes
BY Wesley G. Carr
ATTORNEY Patented June 29, 1926.

1,590,452

UNITED STATES PATENT OFFICE.

HARRY P. SPARKES, OF EDGEWOOD PARK, PENNSYLVANIA, ASSIGNOR TO WESTING-HOUSE ELECTRIC & MANUFACTURING COMPANY, A CORPORATION OF PENNSYLVANIA.

GRAPHIC METER POINTER.

Application filed November 6, 1919. Serial No. 336,108.

My invention relates to recording instruments and particularly to the recording devices thereof.

One object of my invention is to provide a recording device that shall not frictionally engage the record sheet.

Another object of my invention is to provide a record sheet for a recording device of the above indicated character, that shall be susceptible to radiations emitted by the radio-activity of a radio-active salt.

A still further object of my invention is to provide a recording device that shall obviate the necessity for using electromagnetic devices to actuate the same.

A still further object of my invention is to provide a recording device for recording instruments that shall be inexpensive and simple to construct and reliable and effective in its operation.

Heretofore, graphic recording instruments have had inherent disadvantages. Frequent attention has been required for cleaning and for filling the pen. Inaccuracy in readings has been occasioned by the friction of the pen and by the attendant increased consumption of energy incident to this friction. If the pen was actuated directly by the instrument, it was liable to lack sensitiveness because of the weight and the friction of the pen and, consequently, if an accurate instrument was desired, the pen had to be actuated by some independent source of energy. My invention avoids the detrimental effects of the weight and the friction of the marking device and also the necessity for an independent source of energy for the actuation of the marking device, thus rendering the instrument more sensitive and accurate.

In practicing my invention, I provide a pointer or indicating device that has an opaque receptacle, which is impervious to radio-activity, mounted on one end thereof. The receptacle encloses a particle of radio-active salt so disposed that the radiations emitted thereby may pass through a minute opening in the receptacle. The pointer is so disposed with relation to the record sheet that the axis of the opening in the receptacle is perpendicular to the surface of the record sheet. I provide, further a record sheet that shall be susceptible to the radiations emitted through the opening of the supported receptacle and that shall thus receive thereon a record of the movement of the receptacle.

Figure 1 of the accompanying drawings is a front elevational view of a recording instrument embodying my invention; Fig. 2 is an enlarged sectional view of the pen and the record sheet shown in Fig. 1; Fig. 3 is a front elevational view of an oscillograph embodying my invention; Fig. 4 is a side elevational view of the oscillograph shown in Fig. 3.

A graphic meter comprises a movable member 1, an indicating device 2 directly actuated thereby, and a record sheet 3. A receptacle 4, on one end of the indicating device 2, contains a particle 5 of a radio-active salt and completely encloses it except for a minute opening 6. A film 7 of blue fluorescent calcium tungstate is disposed over the opening 6 in the receptacle 4.

The receptacle 4 is opaque and is so impervious to radio-activity that the radiation emitted from the salt 5 shall pass through only the opening 6. The record sheet 3 is sensitive to the radiation emitted from the radio-active salt 5 and, consequently, receives a record of the movement of the indicating device. By placing a thin layer 7 (0.1 mm.) of blue fluorescent calcium tungstate over the radium salt 5, between it and the record sheet 3, the photographic sensibility of the sheet 3 may be increased about five times. By this means, more rapid movements of the indicating device 2 may be recorded.

My invention may also be applied to an oscillograph as illustrated in Figs. 3 and 4. A conductor 8, forming a loop around a pulley 9, is supported in the field of a magnet 10, between two bridges 11 and 12. An opaque receptacle 4, containing a particle 5 of a radio-active salt has one small opening 6 only and is so mounted on the loop of the conductor 8 that the axis of the opening 6 is perpendicular to a record sheet 3. With this arrangement, the necessity for, and the expense of, shutters, arc-lamps and photographing apparatus are avoided.

While I have shown a plurality of forms of recording devices embodying my invention, I do not wish to limit the structure to these forms, as various modifications may be made therein without departing from the spirit and scope of the invention, as set forth in the appended claims.

I claim as my invention:—

1. In an instrument, the combination with a movable radio-active material, of a record sheet that is susceptible to the radio-active material for recording the movement thereof.

2. In an instrument, the combination with a radio-active material, of a movable member bearing the radio-active material, and a movable record sheet that is sensitive to the radiations emitted from the radio-active material for producing a record that varies in accordance with the movement of the movable member.

3. The combination with a radio-active member, of a sensitized record sheet subjected thereto for producing a record of the movement of the radio-active member.

4. In an instrument, the combination with a movable radio-active member, of a sensitized record sheet therefor.

5. The combination with a radio-active element, of a relatively movable recording device sensible thereto for producing a record of the relative movement, and means for increasing the normal record-producing effort of the radio-active element on the recording device.

6. The combination with a radio-active element and a sensitized record sheet, of means for increasing the normal record-producing effort of the radio-active element.

7. The combination with a radio-active element, of a relatively movable recording device sensible thereto for producing a record of the relative movement, and means for directing the radiations from the radio-active element.

8. In an instrument, the combination with a radio-active material and a record sheet that is sensitive to the radiations emitted therefrom, of a thin layer of blue fluorescent calcium tungstate placed between the radio-active material and the record sheet to increase the effect of the radio-active material on the record sheet.

9. In a measuring instrument, the combination with a movable member, of a radio-active material mounted thereon, and a sensitized record sheet for co-operating with the radio-active material.

10. The combination with a movable member, of a radio-active material actuated thereby, and a record sheet that is sensitive to the radiation emitted from the radio-active material for producing a record thereon of the movements of the movable member.

11. A measuring instrument comprising a radio-active material and a sensitized record sheet, relatively movable with respect to each other, for producing a record of the relative movement therebetween.

12. A measuring instrument comprising a movable member actuated in accordance with a quantity to be measured, a radio-active material controlled thereby and a sensitized record sheet co-operating with the radio-active material to produce a record of the variation of the quantity being measured.

13. The combination with a radio-active element, of a relatively movable recording device sensible thereto for producing a record of the relative movement, and means for directing the radiations from the radio-active element and for increasing the normal record-producing effort of said radiations.

14. The combination with a radio-active material and a sensitized record sheet, of a movable member for controlling the action of the radio-active material on the record sheet.

15. The combination with a radio-active material and a sensitized record sheet, of a movable member for controlling the rays of the radio-active material.

In testimony whereof, I have hereunto subscribed my name this 27th day of October, 1919.

HARRY P. SPARKES.